July 18, 1967
D. A. MUELLER ETAL
3,332,008
PHASE ANGLE CONTROLLED FIRING CIRCUIT FOR
VALVES IN MULTI-PHASE SYSTEM
Filed Aug. 28, 1963
2 Sheets-Sheet 1
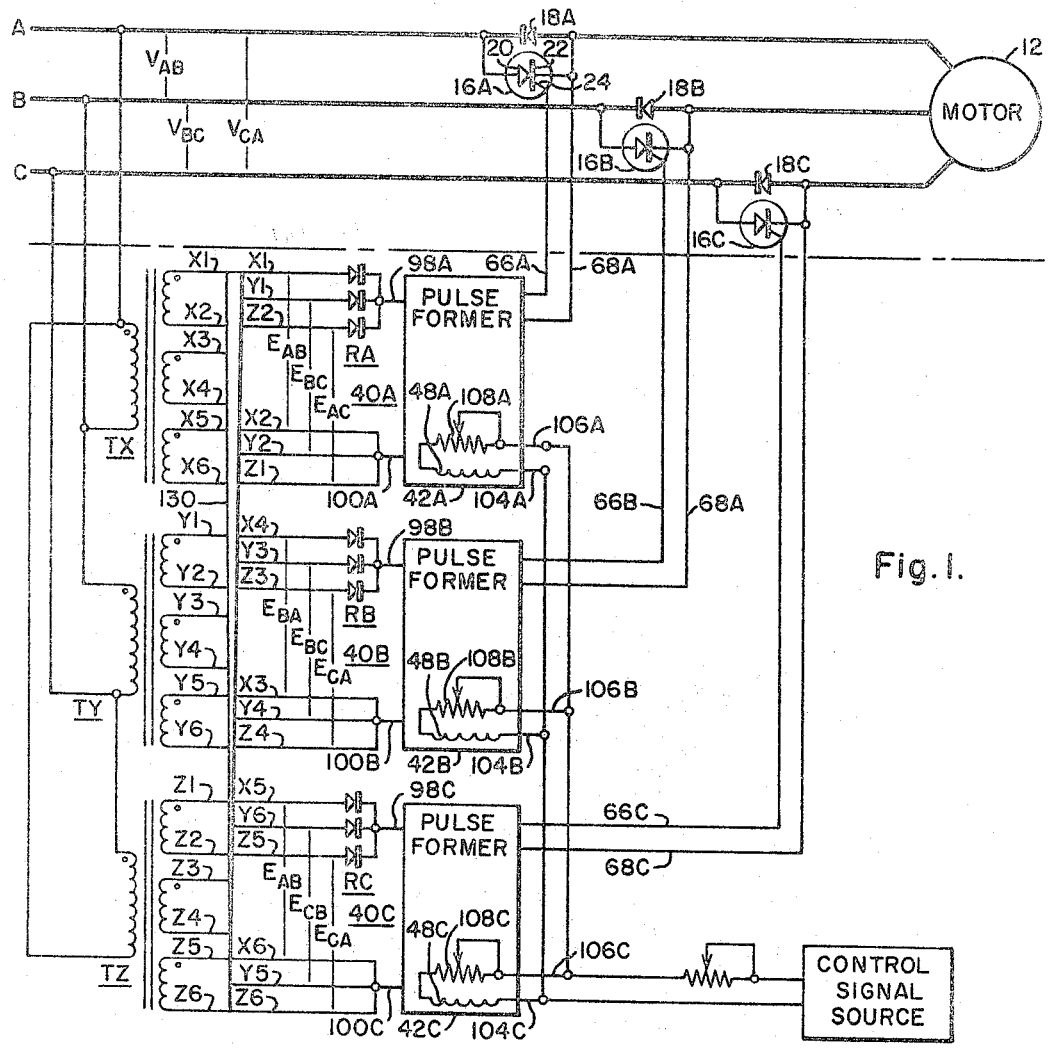
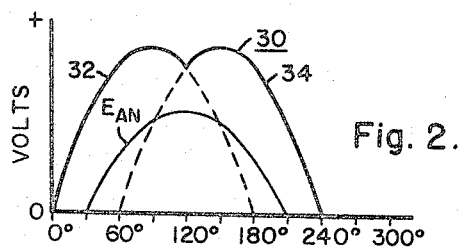
Fig. 2.
WITNESSES:
Bernard R. Gieguay
James F. Young
INVENTORS
Denis A. Mueller and
Dean J. MacGregor.
BY
Clement J Poznakas
ATTORNEY

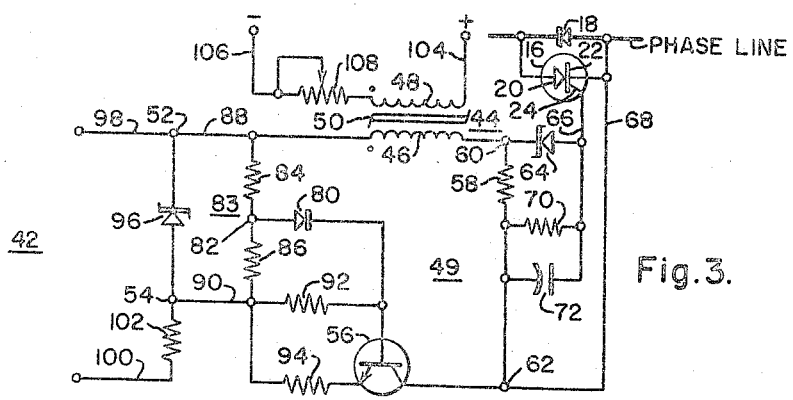
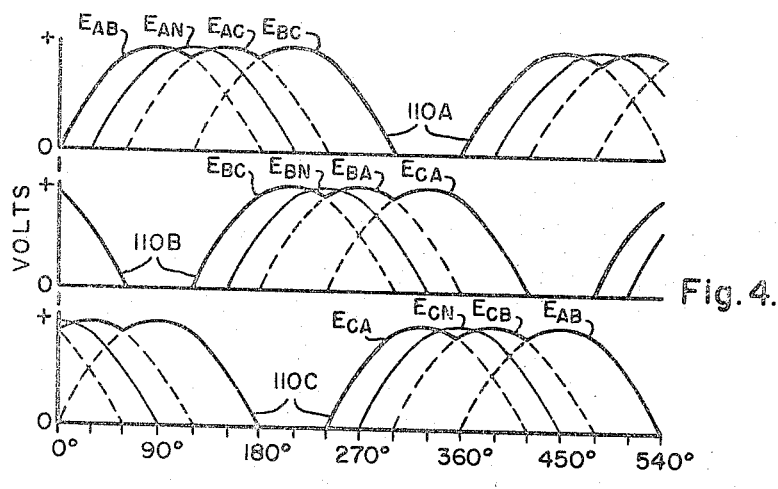
Fig. 3.
Fig. 4.
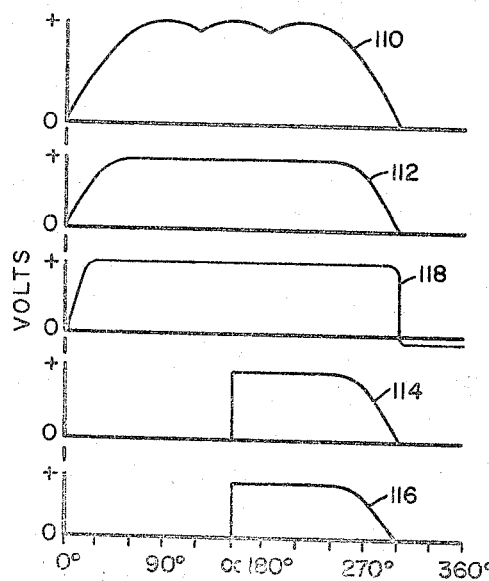
Fig. 5.

United States Patent Office 3,332,008
Patented July 18, 1967

3,332,008
PHASE ANGLE CONTROLLED FIRING CIRCUIT FOR VALVES IN MULTI-PHASE SYSTEM
Denis A. Mueller, Buffalo, and Dean J. MacGregor, Rochester, N.Y., assignors to Westinghouse Electric Corporation, East Pittsburgh, Pa., a corporation of Pennsylvania
Filed Aug. 28, 1963, Ser. No. 305,159
27 Claims. (Cl. 323—22)

This invention relates to electrical control circuits and more particularly to gating circuits for controlled electric valves in polyphase AC (alternating current) systems.

Prior to our invention, it was the general practice to apply 180° gating control to solid state controlled rectifiers in three-phase systems. While 180° gating control is in most cases acceptable in connection with single-phase load control, we have found that 180° gating control does not provide full range control of solid state controlled rectifiers in three-phase systems, especially where reactive loads are concerned, particularly with electric motors. We have found that the possible conduction range of a controlled rectifier in a three-phase system is greater than 180°, and thus for full control, the angular range of the gating signal for each controlled rectifier should be greater than 180°. Since the load current wave in a phase line may be displaced theoretically up to 90° from the line-to-neutral voltage, the possible conduction range of a controlled rectifier in the phase line is the 180° of the forward polarity half-cycles of line-to-neutral wave plus the added 90° for reactive displacement of particular direction (capacitive or inductive), for a total of 270°.

It is therefore an object of the present invention to provide a gating circuit for controlled electric valves which will provide gating signals over a range greater than 180°.

A further object is a gating circuit which will provide a gating signal over the full range of possible conduction times of a controlled electric valve in an electrical system.

Another object is a gating circuit which will provide a gating signal over a range covering a plurality of possible phase dispositions of the load current wave to accommodate a variety of load compositions.

Another object is the realization of the aforesaid objects in connection with polyphase systems having controlled rectifiers in the respective phases of the system.

A still further object is a gating circuit for controlled valves in different phases of a polyphase system, which circuit supplies gating signals that are phase variable over a range that coextends with and overlaps the line-to-neutral voltage.

The above objects are realized in accordance with one embodiment of the invention wherein controlled rectifiers in different phases of a three-phase system are gated by individual gating circuits, each including a saturable reactor driven, phase-adjustable, pulse generator powered by suitably phased 300°, periodic, undirectional waves produced by an AC–DC (alternating current to direct current) conversion network including a rectifier supplied by a three-phase set of voltages, the first voltage in sequence leading the second by 60° and the third by 120°. The phase of the pulses produced by the pulse generator is responsive to the firing angle of the saturable reactor, which in response to control signals may be varied across the extent of the input power supply wave to the pulse generator or 300°, thus blanketing the possible conduction range of the valve in a three-phase system.

A further aspect of the invention is directed to the prevention of accidental firing of the controlled rectifier during reset time of the reactor by voltages induced in the reactor load winding by reset current. This is accomplished in one embodiment by a normally off-biased electric valve in the reactor load circuit, which valve is gated ON in response and only during the presence of a unidirectional supply pulse to the reactor.

Other and further objects and advantages of the present invention will become apparent from the following description taken in connection with the drawings wherein a preferred embodiment of the invention is illustrated in connection with a three-phase load control system.

In the drawings:

FIGURE 1 is a diagram of a three-phase motor control circuit embodying features of the invention;

FIG. 2 is a graph illustrating voltage relations under certain conditions in the phase lines of load circuit of FIG. 1;

FIG. 3 is a schematic diagram of a pulse generator which may be employed in the circuit of FIG. 1;

FIG. 4 is a graph illustrating the voltage relations in the synthesis of the periodic unidirectional supply voltage waves for powering the respective pulse generators; and FIG. 5 is a chart illustrating voltage relations at various points in the pulse generator circuit of FIG. 3.

Referring now to FIG. 1 there is shown, above the dot-dash line, a three-phase load control circuit having phase lines A, B and C, for supplying three-phase power from a three-phase AC source (not shown) to a load, for example, the motor shown at 12. Each of the phase lines has connected therein a controlled electric valve 16 having a forward direction of current flow, and in parallel therewith a unidirectional current conducting device 18, for example a diode with its forward direction oppositely related to the forward direction of the controlled valve to provide a path for reverse current flow. It should be noted that similar components associated with the different phases are labeled with the same reference numeral suffixed however by the letter identifying the associated phase. Thus, the controlled valves in lines A, B and C, are indicated at 16A, 16B and 16C, respectively.

The controlled valves may be of any suitable type which when subjected to voltage of particular polarity will normally block such voltage but will be rendered highly conductive in a particular direction in response to a gating signal of appropriate magnitude and polarity. By way of example the controlled valves may be solid state controlled valves, for instance the illustrated silicon controlled rectifiers or gated PNPN switches.

Each of the controlled valves has a power current inlet terminal 20, a power current outlet terminal 22, and an internal power current path therebetween. Each valve is also provided with a control terminal 24.

The valves shown by way of example normally block current flow in both directions. However in response to the application of a control signal of appropriate magnitude and polarity to the control terminal of the valve, the valve is rendered highly conductive in a particularly direction generally referred to as the forward direction. Conduction continues until the power current therethrough falls below a predetermined sustaining value.

The respective inlet, outlet and control terminals of a silicon controlled rectifier are usually referred to as the anode, cathode, and gate terminals respectively. With specific regard to silicon controlled valves, forward voltage is applied to them when the anode is made positive relative to the cathode. With the appropriate positive voltage on the anode, a silicon controlled valve will be gated (rendered conductive) when the gate terminal has applied thereto a voltage of appropriate polarity to forward bias the gate junction and whose magnitude is at least a predetermined minimum. Some silicon controlled valves are fired by applying a positive voltage on the gating electrode relative to the cathode while other silicon controlled valves are fired by applying a negative voltage to the gating electrode relative to the anode. In the specific examples disclosed, the valves 16A, 16B and 16C will fire (be gated) when a positive signal is applied to the gate terminal relative to the cathode while the valve is forward biased, that is, with positive voltage on the anode electrode relative to the cathode.

When there is no conduction in the circuit thus far described, the forward voltage across a controlled valve is as typified by the heavy solid line wave 30 in the graph of FIG. 2, which shows voltages relating to phase line A and its associated valve 16A. That is, the valve 16A is blocking voltage during the interval when line A is more positive than either line B or line C. This causes the double-topped wave 30 of 240° duration. The wave 30 is derived from the two half wave portions 32 and 34, the half wave 32 representing the time when line A is more positive than line B, and the half wave 34 representing the time when line A is more positive than line C. The curve $E_{AN}$ represents the forward polarity half-cycle of the "line to load neutral" voltage of phase line A.

To turn the circuit completely off, the firing signal must be absent during the latter 210° interval of the double-topped wave 30. To turn the circuit completely on, it is necessary that the firing signal be of sufficient magnitude to fire the valve at the 30° point in FIG. 2.

Whether load 12 is a Y or delta load, and whether or not there is a structural load neutral, there is a line-to-neutral voltage as is well recognized in the art. While source and load neutrals are generally the same, the neutral referred to herein is the load neutral. The load 12 may for example be considered a Y load. The line-to-neutral voltage of a phase lags by 30° the phase-to-phase voltage between that phase and the next phase in positive sequence. Due to the constraints in a three-phase system, the load current will be either in phase or out of phase with the line-to-neutral voltage, depending on the power factor of the load, the theoretical limiting condition being a purely reactive load which would dictate a 90° shift between the current and voltage in a direction depending on the type of reactance.

To provide full range of control for load compositions varying from resistive to inductive, the gating signal should be effectively phase-variable over a range extending for 270° from the front zero crossing of the line-to-neutral voltage of the phase line. For phase A, this range extends from the 30° mark to the 300° mark in FIG. 2. If the firing voltage is a wave with a sine front it must be initiated at a point prior to the front zero crossing of the wave $E_{AN}$, in order to fire the valve in phase A at that point for full ON operation. The front zero crossing of a wave may also be referred to as the time zero point of the wave.

In accordance with our above findings we have provided for each controlled valve in FIG. 1, a control circuit 40 which provides a gating signal that is phase-variable over a range greater than 180°. The control circuits 40 for valves 16A, 16B and 16C are labeled 40A, 40B and 40C in accordance with the hereinbefore established convention. Each control circuit includes a phase adjustable pulse former 42 and a power supply therefor. By way of example the pulse former is of a type which is powered with periodic unidirectional waves, and which produces output pulses whose phase may be adjusted through a range coextensive with the extent of the unidirectional input supply waves. The pulse formers 42A, 42B and 42C are alike, and in FIG. 3 there is illustrated an example of a pulse former which may be employed at 42 (A, B and C).

In the example of FIG. 3, the pulse former includes a saturable electromagnetic drive in the form of a saturable reactor 44 having respective load and control windings 46 and 48 wound on a "square loop" magnetic core 50. Load winding 46 is part of a load circuit 49 including in series a pair of supply input terminals 52 and 54, an electric valve 56 and a load resistor 58 connected between junctions 60 and 62.

An output taken across resistor 58 is passed through a threshold device 64 and output lines 66 and 68, and applied across the gate junction of the controlled valve 16 to effect control thereof. While resistor 58 provides a path for the exciting current for core 50, the threshold device 64 which may be a Zener diode as shown, prevents the voltage due to the exciting current from appearing at the control terminal 24 of the valve 16. An output pulse appears on lines 66 and 68 only when the threshold of the Zener diode 64 is exceeded. This occurs when the reactor 44 is fired. The gating pulses appearing on output lines 66 and 68 are substantially the difference between the output pulse across terminals 60 and 62 and the drop of the Zener diode 64. The Zener diode 64 is chosen to insure that the OFF voltage is less than the minimum required to fire a controlled valve at operating temperature, and the ON voltage is greater than that required to fire a cold controlled valve. A resistor 70 and a capacitor 72 form a surge suppressor or "noise filter" which prevents induced voltages from erroneously firing the control valve 20.

The valve 56 is shown as a transistor operated in the switching mode and having its internal power path (collector-emitter circuit) connected between junction 62 and supply input terminal 54. The control or base terminal of transistor 56 is connected through a diode 80 to an intermediate tap 82 of a voltage divider 83 formed by resistors 84 and 86 connected across lines 88 and 90 tied to terminals 52 and 54 respectively. A pair of bias resistors 92 and 94 are connected from the lower end of resistor 86 to the base and emitter terminals respectively of the transistor 56. A threshold device such as a Zener diode 96 is connected across the input supply terminals 52 and 54, which are connected to input supply lines 98 and 100 through a resistor 102. The control winding 48 is connected to control input lines 104 and 106 through a variable resistor 108 for the receipt of a DC control signal.

Except for 120° displacement between the respective voltage supply waves supplied to the power input lines 98–100 of the respective pulse formers 42A, 42B, and 42C, their operation is the same as exemplified in FIG. 3. Each of the pulse formers over its power input lines 98 and 100 is supplied with periodic unidirectional voltage waves of a duration related to the desired range of phase variation of the output pulses produced by the pulse former and sent out on the output lines 66 and 68. In the disclosed example, the unidirectional supply voltage waves, produced in a manner hereinafter described, are 300° long and lead by 30° the forward polarity half-cycles of the line-to-neutral voltage of the particular phase served by that pulse former.

Curves representing the respective input voltage supply waves applied to the power input lines 98–100 of the respective pulse formers 42A, 42B, and 42C, are shown at 110A, 110B and 110C in FIG. 4 in which the 120° phase separation between these waves can be seen. A curve representing the input voltage wave applied to lines 98 and 100 of the example in FIG. 3 is shown at 110 in FIG. 5. This figure shows a group of curves on the same time base which represent voltage patterns at the various circuit points of the pulse former in FIG. 3.

The supply voltage applied to lines 98 and 100 is clipped by the Zener diode 96 and resistor 102, providing a square wave of a magnitude determined by the Zener diode and 300° in duration. Resistor 102 absorbs the clipped portion of the wave. The clipped wave which appears on lines 88 and 90 is shown at 112 in FIG. 5. When the supply voltage is present, with line 88 more positive than line 90, the base of transistor 56 is biased positively through diode 80 and the tap 82 of the voltage divider 83. This drives the transistor to saturation, thus closing the load circuit of the pulse former. In the meantime, the core 50 supports the supply voltage until the reactor 44 fires at a time determined by the previous flux level of the core. After the reactor 44 fires the balance of the voltage wave appears across the resistor 58, and in reduced proportion on lines 66 and 68. The voltages across junctions 60 and 62, and on line 66 are illustrated by the wave forms 114 and 116, respectively in FIG. 5, wherein α denotes the firing angle. At the end of the supply voltage wave the reactor 44 is reset to a degree dependent on the amount of ampere-turns produced by the reset winding 48. The firing angle α may be adjusted to occur at any desired angle along the 300° extent of the supply wave by varying the amount the core 50 is reset in each cycle. The larger the reset ampere-turns, the more the cores are reset and the longer they will block the gate voltage on the next cycle. Thus the valve 20 fires later in the power cycle and the RMS value of current is reduced. If the saturation direction toward which the voltage supply waves drive the core is referred to as positive saturation, then the direction toward which the control or reset signal tends to drive the core is negative saturation.

Since the voltage across the reset winding 48 during resetting must be relatively large to completely reset the core during the available 60° interval, the current induced in the load winding circuit of the reactor may be sufficient to fire the valve 16, even with the Zener diode limiting network. Transistor 56 prevents the flow of this current by being switched to the cutoff state during the reset period of the core 50. When the supply voltage is zero as during the reset period, the bias developed by resistor 94 drives the base of transistor 56 negative with respect to the emitter through resistor 92. As a result, the transistor is cutoff, thus opening the load circuit 49 of the pulse former. This action reduces the OFF voltage at the gate terminal of the valve 16 to nearly zero and also reduces the reset power required. The voltage on the base of the transistor 56 relative to the emitter is depicted by curve 118 in FIG. 5. The phase of the gating pulses supplied by the pulse former 42 to the valve 16 along the pulse former output lines 66 and 68, varies with and follows the firing angle of the reactor 44. Thus, the phase of the gating pulse supplied to the valve 16 may be adjusted over a range substantially coextensive with the 300° extent of the voltage supply waves to the pulse former. The particular example of a pulse former disclosed in FIG. 3 is a magnetic amplifier.

As shown in FIG. 1, the control winding 48 of the respective reactors 44 are connected in parallel to eliminate inter-action between the phases. The parallel connection causes the induced current in other phases to be opposite in direction to the gate current of a particular phase allowing it to be blocked by the supply voltage. The variable resistor 108 in each pulse former 42 provides an adjusting means to insure that the reactor in each pulse former saturates at the same point in the supply voltage wave.

An example of one arrangement for producing the unidirectional periodic supply waves 110 for the respective pulse formers 42 (A, B and C) is illustrated in FIG. 1. This includes, connected to the input of each pulse former, a three-phase half-wave rectifier R, to which is applied a set of three sequential AC voltages derived from the source side of phase lines A, B and C. The second voltage of the set is spaced 60° in opposite directions from the first and third voltages of the set, i.e., the first voltage in sequence leads the second by 60° and the third by 120°. The first in sequence also leads the forward polarity half-cycle of the line-to-neutral voltage wave by 30°. The respective rectifiers R for the gating circuits serving phase lines A, B and C, are labeled RA, RB and RC, in accord with the convention adopted herein. Each of these rectifiers includes three diode branches connected to a common junction and the input line 98 of the associated pulse former 42.

In accordance with the example of FIG. 1, the voltages supplied to the rectifiers are synthesized by a transformer arrangement including transformers TX, TY, and TZ. Each transformer has three secondaries, each secondary of each transformer being connected to a diode branch of a different one of rectifiers RA, RB and RC, whereby each rectifier is energized by outputs from the three transformers in a particular phase pattern. The phase patterns applied to the inputs of the various rectifiers RA, RB and RC, are illustrated by the related referencing between output terminals of each secondary and the input lines of the rectifier to which the secondary is connected. For example, the terminals of the top secondary of transformer TX are marked X1 and X2 and are connected to similarly marked input terminals X1 and X2 of rectifier RA. All the separate interconnecting lines between the transformers and the rectifiers are shown as housed in a common cable 130. The polarity dot convention indicates that in a given transformer all winding ends marked with a dot have the same instantaneous polarity.

Indicated in the above-described manner are the following connections. The middle secondary of transformer TX is connected to a branch of rectifier RB, and the bottom secondary of transformer TX is connected to a branch of rectifier RC. Each secondary of transformer TY is connected to a branch of a different one of rectifiers RA, RB and RC, and each secondary of transformer TZ is connected to a branch of a different one of these rectifiers. It will be further observed that each branch of a rectifier R is served by a different transformer.

More specifically, one diode branch of rectifier RA is supplied along line X1 with a voltage $E_{AB}$ which is in phase with voltage $V_{AB}$. A second diode branch of rectifier RA is supplied along the line Y1 with a voltage $E_{BC}$ in phase with $V_{BC}$. The third diode branch of rectifier RA is supplied along line Z2 with a voltage $E_{AC}$ oppositely phased relative to $V_{CA}$. By similar techniques, one diode branch of rectifier RB is supplied with a voltage $E_{BA}$ 180° out of phase with $V_{AB}$, a second diode branch of rectifier RB is supplied with a voltage $E_{BC}$ in phase with $V_{BC}$, and the third diode branch of rectifier RB is supplied with a voltage $E_{CA}$ in phase with $V_{CA}$. One diode branch of rectifier RC is supplied with a voltage $E_{AB}$ in phase with $V_{AB}$, a second diode branch of rectifier RC is supplied with a voltage $E_{CB}$ oppositely phased with voltage $V_{BC}$, and the third diode branch of rectifier RC is supplied with a voltage $E_{CA}$ in phase with $V_{CA}$. It may be noted that voltages $E_{AB}$, $E_{AC}$, $E_{BC}$, $E_{BA}$, $E_{CA}$, and $E_{CB}$, are 60° apart in the order named.

As a result of the input thereto, rectifier RA produces and supplies to the power input circuit 98A and 100A of pulse former 42A triple-topped 300° unidirectional periodic waves "constructed" from the positive half-cycles of voltages $E_{AB}$, $E_{BC}$, and $E_{AC}$, as depicted in FIG. 4 at 110A, which also shows that the unidirectional wave 110A leads the line-to-neutral voltage $E_{AN}$ of phase A by 30° and overlaps the trailing edge of the positive half-cycle of $E_{AN}$ by 90°.

In response to the voltages applied to its input, rectifier RB supplies to the power input lines of pulse former 42B 300° unidirectional waves constructed from the positive half-cycle of $E_{BC}$, $E_{BA}$ and $E_{CA}$ as represented by curve 110B in FIG. 4. The wave 110B leads the line-to-neutral voltage $E_{BN}$ of phase B by 30° and overlaps the trailing edge of the positive half-cycle of $E_{BN}$ by 90°.

Voltages $E_{CA}$, $E_{CB}$ and $E_{AB}$ are rectified by rectifier RC to produce unidirectional triple-topped periodic waves synthesized from the positive half-cycles of these voltages as graphically shown at 110C in FIG. 4. Waves 110C lead the line-to-neutral voltage $E_{CN}$ of phase C by 30°, and overlap the trailing edge of the positive half-cycle of $E_{CN}$ by 90°.

As seen in FIG. 4, waves 110A, 110B and 110C are 120° apart. It can also be seen from this figure that the positive half-cycle of $E_{AN}$ is coextensive with 180° of wave 110A and that the latter wave extends beyond both ends of the positive half cycle of $E_{AN}$, i.e., the front edge of wave 110A leads the front edge of the positive half-cycle of $E_{AN}$, and the trailing edge of wave 110A lags the trailing edge of the positive half-cycle of $E_{AN}$. In like manner, $E_{BN}$ is coextensive with 180° of wave 110B, and the latter wave extends beyond both ends of the positive half-cycle of $E_{BN}$. Similarly, the voltage $E_{CN}$ is coextensive with 180° of wave 110C, and the latter wave extends beyond both ends of the positive half-cycles of $E_{CN}$.

It may also be seen from the curves of FIG. 4, that the front of each of the unidirectional waves 110 (110A, 110B, and 110C) leads the line-to-neutral voltage of the phase served by the pulse former powered by that wave.

From the foregoing description, it will be apparent that the respective pulse formers 42 (42A, 42B and 42C) are supplied sequentially with unidirectional 300° pulses in the necessary order to drive pulse formers 42A, 42B and 42C to produce gating pulses for firing the valves 16 (16A, 16B and 16C) in proper phase sequence. Proportional control of the valves 16 is obtained by varying their firing angles in response to a common control signal applied at the same time to all the control windings 48 of all the pulse formers 42. In each phase line, load current will flow during a flow period whose phase position is dependent on the power factor of the load. The 300° range of gating signal phase adjustment of the example described herein will provide substantially full range control for flow periods of loads varying from resistive to inductive.

The invention is suitable for all types of load connections, for example Y and delta connected loads.

It is to be understood that the hereindescribed arrangements are simply illustrative of the principles of the invention, and that other embodiments and applications are within the spirit and scope of the invention.

We claim as our invention:

1. In a load control system wherein a plurality of phase lines supply power from a polyphase AC source to a load, each of said phase lines having connected therein a normally non-conductive controllable electric valve, each valve when subjected to voltage of a particular polarity being gateable to pass load current in a particular direction in response to a gating signal, and wherein each of said valves has connected thereacross unidirectional current conduction means poled to pass current in the opposite direction, a valve control circuit for each of said valves comprising means for producing periodic spaced unidirectional waves having a phase position and time duration such that they are longer than the half cycles of said particular polarity of the line-to-neutral voltage of the phase in which the associated valve is connected and each of said half cycles is coextensive with a portion of a different one of said waves, phase adjustable pulse forming means having a power input circuit energized by said waves and also having adjustable phase control means, said pulse forming means being operable to produce output pulses whose phase position may be varied substantially across the angular extent of said waves, and whose particular phase position is selectable in response to adjustment of said phase control means, and means for applying said pulses as gating signals to the valve served by the control circuit.

2. The combination as in claim 1 wherein each said means for producing unidirectional waves comprises AC–DC conversion means coupled to said phase lines.

3. In a load control system wherein a plurality of phase lines supply power from a polyphase AC source to a load, each said phase line having connected therein a controllable electric valve, each valve when subjected to a particular polarity voltage being normally non-conductive but being capable of being rendered conductive in a particular direction in response to a control signal, whereby current will flow through the valve during a flow period whose phase position is dependent on the power factor of the load, there being a particular angular range within which the flow periods for a predetermined variety of power factor values may occur, and wherein each of said phase lines has unidirectional current conduction means connected in inverse parallel relation with the valve in the phase line, a valve control circuit for each of said valves comprising means for producing spaced unidirectional waves over 180° long and having a phase position and time duration such that they are at least coextensive with said angular range of the phase in which the associated valve is connected, a phase adjustable pulse generator having a power input circuit energized by said waves and also having adjustable phase control means, said generator being operable to produce output pulses whose phase position may be varied substantially across the angular extent of said waves, and whose particular phase position is selectable in response to adjustment of said phase control means, and means for applying said pulses as gating signals to the valve served by the control circuit.

4. The combination as in claim 3 wherein each said means for producing unidirectional waves comprises AC–DC conversion means coupled to said phase lines.

5. In a load control system wherein a plurality of phase lines supply power from a polyphase AC source to a load, each of said phase lines having connected therein a normally non-conducting controllable electric valve, each valve during periods of forward voltage thereon being capable of being rendered conductive in a particular direction in response to a gating signal, whereby current will flow through the valve during a flow period whose phase position is dependent on the power factor of the load, there being a particular angular range within which the flow periods for a predetermined variety of power factor values may occur, and wherein each of said phase lines has unidirectional current conduction means connected in inverse parallel relation with the valve in the phase line, a control network for supplying phase-adjustable gating signals to said valves, said control network comprising a gating circuit for each valve, each gating circuit comprising pulse forming means including saturable core electromagnetic circuit means for developing output pulses whose phase position is determined by the firing angle of the electromagnetic circuit means, the latter means having respective power and control circuits, said control circuit having means for varying said firing angle, and means for supplying to said power circuit unidirectional periodic electric waves longer than 180° and having the frequency of said AC and a duration and position in time whereby said waves are at least coextensive with said angular range.

6. The combination of claim 5 wherein said electromagnetic circuit has a load circuit and reset means which subjects said load circuit to undesirable induced voltages, and means for preventing current flow through said load circuit due to said induced voltages, the latter means comprising a normally non-conducting additional valve in said load circuit, said additional valve having a control terminal, said load circuit being open when said additional valve is not conductive, means for deriving from said power circuit an enabling signal when one of said waves is present, and means for applying said enabling signal to said control terminal, whereby said additional valve is rendered capable of conducting only while one of said waves is applied to said power circuit.

7. In a control system wherein a plurality of phase lines supply power from a polyphase source to a load, each of said phase lines having connected therein a normally non-conducting controllable electric valve, each valve when subjected to forward voltage being capable of being rendered conductive in a particular direction in response to a gating signal, and wherein each of said valves has connected thereacross unidirectional current conduction means poled to pass current in the opposite direction, a control system for supplying phase-adjustable gating signals to said valves, said control system comprising a gating circuit for each valve, each gating circuit comprising a pulse generator including saturable core electromagnetic circuit means for developing output pulses whose phase position is determined by the firing angle of the saturable core of said electromagnetic circuit means, said electromagnetic circuit means having power input means and a control circuit, said control circuit having means for varying said firing angle, and means for supplying to said power input circuit periodic unidirectional electric waves having the frequency of said AC and having a duration and position in time whereby said waves are longer than the forward polarity half-cycles of the line-to-neutral voltage of said phase and each of said half cycles is coextensive with a portion of a different one of said waves.

8. The combination as in claim 7 wherein said electromagnetic circuit means has a load circuit including a saturable reactor load winding, a normally non-conductive additional electric valve, said power input means, and load output means, said load circuit being open when said additional valve is not conductive said additional valve having a control electrode, voltage divider means connected across said power input for deriving from said power input means a signal whenever one of said waves of supply voltage is present, and means for applying said derived signal to said control electrode, whereby said valve is rendered capable of conduction only while one of said waves is applied to said power input means.

9. In a load control system having three phase lines for supplying a load from a three-phase AC source, each phase line having connected therein a controlled electric valve with a control electrode, said valve when subjected to forward voltage being normally non-conductive but being capable of being rendered conductive in a particular direction in response to a control signal applied to its control electrode, and wherein each of said valves has connected thereacross unidirectional current conduction means poled to pass current in the opposite direction, a gating circuit for each of said valves, each gating circuit including means for providing unidirectional waves, and a phase-variable pulse generator powered by said waves and connected to supply gating pulses to the associated valve, said generator having a power input circuit and a control input circuit, said generator being operable to produce output pulses whose phase position may be varied substantially across the extent of said waves and whose phase position is dependent upon control signals applied to said control input circuit, the unidirectional waves being greater than 180° and having a leading edge substantially coincident with the leading edge of the forward half-cycle of the voltage across the associated phase line and the next phase line in the sequence of phase rotation.

10. The combination as in claim 9 wherein said generator is a magnetic amplifier having a load circuit in response to which said gating pulses are produced, said load circuit including a saturable reactor load winding, a normally non-conductive additional electric valve, said power input circuit and load output means, said amplifier being operable to be fired while one of said waves is applied to said power input circuit, said load circuit being open when said additional valve is not conductive, the latter valve being operable to conduct in response to and only while one of said waves is applied to said power input circuit.

11. In a load control system having three phase lines for supplying a load from a three-phase AC source, each phase line having connected therein a controlled electric valve with a control electrode, said valve when subjected to forward voltage being normally non-conductive but being capable of being rendered conductive in a particular direction in response to a control signal applied to its control electrode, and wherein each of said valves has connected thereacross unidirectional current conduction means poled to pass current in the opposite direction, a gating circuit for each of said valves, each gating circuit including AC to DC rectifier means for providing periodic unidirectional waves, and phase-variable pulse forming means powered by said waves and connected to supply gating pulses to the associated valve, said pulse forming means having a power input circuit and adjustable phase control means and being operable to produce output pulses whose phase position may be varied substantially across the extent of said waves and whose phase position is dependent upon the adjustment of said phase control means and, transformer means connected to the source side of said phase lines for supplying to each of said rectifier means a plurality of AC voltages phase displaced from each other, whereby each rectifier means produces unidirectional waves over 180° long which overlap both ends of the forward polarity half-cycles of the line-to-neutral voltage of the phase whose gating circuit is powered by that rectifier means.

12. In a load control system having three phase lines A, B and C, for supplying a load from a three-phase AC source whereby a phase-to-phase voltage $V_{AB}$ appears across lines A and B, a phase-to-phase voltage $V_{BC}$ appears across lines B and C, and a phase-to-phase voltage $V_{CA}$ appears across lines C and A, each phase line having connected therein a controlled electric valve with a control electrode, said valve when subjected to a particular polarity voltage being normally OFF but being capable of being turned ON for current flow in a particular direction in response to a control signal applied to said control electrode, and wherein each of said valves has connected thereacross unidirectional current conduction means poled to pass current in the opposite direction, a control circuit for controlling said valve comprising means for producing AC voltages $E_{AB}$, $E_{AC}$, $E_{BC}$, $E_{BA}$, $E_{CA}$, and $E_{CB}$, 60° apart in the order named, voltage $E_{AB}$ being in phase with voltage $V_{AB}$, half-wave three-phase rectifiers RA, RB and RC, means for applying said voltages $E_{AB}$, $E_{AC}$ and $E_{BC}$ to rectifier RA, means for applying said voltages $E_{BC}$, $E_{BA}$ and $E_{CA}$ to rectifier RB, means for applying said voltages $E_{CA}$, $E_{CB}$ and $E_{AB}$ to rectifier RC, whereby each of said rectifiers produces 300° unidirectional output waves, the output waves of the respective rectifiers being 120° apart, pulse generating means GA, GB and GC, powered by the output of rectifiers RA, RB and RC, respectively, and connected to supply control pulses to the control electrodes of the valves in the phase lines A, B and C, respectively, each said generating means having phase control means for varying the phase position of its output pulses.

13. The combination of claim 12 wherein each of said generators is a magnetic amplifier having a load circuit in response to which said control pulses are produced, said load circuit including a saturable reactor load winding, a normally non-conductive additional electric valve, power input means and load output means, said amplifier being operable to be fired during particular polarity pulses of supply voltage applied to said power input means, said load circuit being open when said additional valve is not conductive, said additional valve having a control electrode, means for deriving from said power input means a signal whenever one of said pulses of supply voltage is present, and means for applying said derived signal to said control electrode, whereby said additional valve is rendered capable of conduction only while a supply voltage pulse of said particular polarity is applied to said power input means.

14. In a load control system having three phase lines A, B and C, for supplying a load from a three-phase AC source whereby a phase-to-phase voltage $V_{AB}$ appears across lines A and B, a phase-to-phase voltage $V_{BC}$ appears across lines B and C, and a phase-to-phase voltage $V_{CA}$ appears across lines C and A, each phase line having connected therein the power path of a controlled electric valve with a control electrode, said valve when subjected to forward voltage being normally OFF in the forward direction but being capable of being turned ON in said direction in response to a control signal applied to said control electrode, and wherein each of said valves has connected thereacross unidirectional current conduction means poled to pass current in the opposite direction, a control circuit for controlling said valves comprising transformers TA, TB and TC, each having an input and a plurality of outputs, the input of TA being across phase lines A and B, the input of TB being across phase lines B and C, and the input of TC being across phase lines C and A, half-wave three-phase rectifiers RA, RB and RC, means connected to outputs of said transformers for applying to rectifier RA a set of three AC voltages $E_{AB}$, $E_{AC}$ and $E_{BC}$, $E_{AB}$ leading $E_{AC}$ by 60° and $E_{BC}$ by 120°, whereby rectifier RA produces 300° unidirectional output waves, connections from outputs of said transformers to rectifier RB for supplying to that rectifier a set of three AC voltages $E_{BC}$, $E_{BA}$ and $E_{CA}$, $E_{BC}$ leading $E_{BA}$ by 60° and $E_{CA}$ by 120°, whereby rectifier RB produces 300° unidirectional output waves, connections from outputs of said transformers to rectifier RC for supplying to that rectifier a set of three AC voltages $E_{CA}$, $E_{CB}$, and $E_{AB}$, $E_{CA}$ leading $E_{CB}$ by 60° and $E_{AB}$ by 120°, whereby rectifier RC produces 300° unidirectional output waves, the respective voltages $E_{AB}$, $E_{BC}$ and $E_{CA}$ being in phase with voltages $V_{AB}$, $V_{BC}$ and $V_{CA}$ respectively, and the respective voltages $E_{AC}$, $E_{BA}$ and $E_{CB}$ being of opposite phase relative to voltages $V_{CA}$, $V_{AB}$ and $V_{BC}$, respectively, and phase adjustable pulse generating means GA, GB and GC powered by the outputs of rectifiers RA, RB and RC respectively, and connected to supply control pulses to the control electrodes of the valves in the phase lines A, B and C, respectively.

15. The combination as in claim 3 wherein each of said valves is a solid state controlled rectifier.

16. The combination as in claim 3 wherein there is means for adjusting all said phase control means in response to a common control signal.

17. The combination as in claim 7 wherein each of said valves is a solid state controlled rectifier.

18. The combination as in claim 11 wherein each of said valves is a solid state controlled rectifier.

19. The combination as in claim 11 wherein there is means for adjusting all said phase control means in response to a common control signal.

20. The combination of claim 11 wherein said plurality of AC voltages is a set of three AC voltages with one of these voltages spaced 60° from the other two voltages in opposite directions, whereby each rectifier means produces unidirectional waves 300° long.

21. The combination as in claim 12 wherein each of said valves is a solid state controlled rectifier.

22. The combination as in claim 12 wherein there is means for adjusting all said phase control means in response to a common control signal.

23. The combination as in claim 14 wherein each of said valves is a solid state controlled rectifier.

24. The combination of claim 14 wherein each of said pulse generating means is a saturable electromagnetically driven pulse generating means having signal responsive phase control means for adjusting the phase of its output pulses, and wherein said combination further includes means for controlling all said phase control means in response to a common control signal.

25. In a load control system wherein a plurality of phase lines supply power from a polyphase source to a load, each of said phase lines having connected therein a normally non-conductive controllable electric valve, each valve when subjected to voltage of a particular polarity being gateable to pass load current in a particular direction in response to a gating signal, and wherein each of said valves has connected thereacross oppositely poled unidirectional current conducting means, valve control circuits for each of said valves, each valve control circuit having adjustable phase pulse generating means for generating output pulses whose phase is adjustable over a range that is longer than 180° and overlaps the half-cycles of said particular polarity of the line-to-neutral voltage of the phase in which the associated valve is connected, and means for applying said pulses as gating signals to the valve served by the valve control circuit.

26. The combination as in claim 25 wherein each of said valves is a solid state controlled rectifier.

27. The combination of claim 25 which further includes means for controlling the phase position of the output pulses of all said pulse generating means in response to a common control signal.

References Cited

UNITED STATES PATENTS 3,151,286   9/1964   Berman _____ 321—27

JOHN F. COUCH, *Primary Examiner.*

K. D. MOORE, M. L. WACHTELL, *Assistant Examiners.*